(12) United States Patent
Viswanathan et al.

(10) Patent No.: US 9,535,748 B2
(45) Date of Patent: Jan. 3, 2017

(54) APPARATUS AND METHOD FOR MATCHING OFFERS AND REQUESTS FOR SHARING OF RESOURCES

(75) Inventors: Ramesh Viswanathan, Manalapan, NJ (US); Adiseshu Hari, Holmdel, NJ (US); Yuh-Jye Chang, Bridgewater, NJ (US); T. V. Lakshman, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 813 days.

(21) Appl. No.: 13/370,443

(22) Filed: Feb. 10, 2012

(65) Prior Publication Data
US 2013/0212275 A1    Aug. 15, 2013

(51) Int. Cl.
*G06F 15/173* (2006.01)
*G06F 9/50* (2006.01)

(52) U.S. Cl.
CPC ...................................... *G06F 9/50* (2013.01)

(58) Field of Classification Search
CPC ....................................................... G06F 9/50
USPC ....................................................... 709/226
See application file for complete search history.

(56) References Cited

U.S. PATENT DOCUMENTS

| 5,732,214 A | 3/1998 | Subrahmanyam |
| 7,924,718 B2* | 4/2011 | Feng et al. ................... 370/230 |
| 8,428,990 B2* | 4/2013 | Moll ..................... G06Q 10/06 705/7.12 |

| 2013/0055091 A1* | 2/2013 | Dutta ................... G06F 9/5077 715/736 |

OTHER PUBLICATIONS

"Amazon Elastic Compute Cloud (Amazon EC2)," Amazon Web Services, http://aws.amazon.com/ec2/, printed Feb. 9, 2012.
"Focus on Prices and Spending," Office of Publications & Special Studies, Consumer Expenditures: 2008, U.S. Bureau of Labor Statistics, May 2010, vol. 1, No. 4, http://www.bls.gov/opub/focus/volume1_number4/cex_1_4.htm, printed Feb. 9, 2012.

(Continued)

*Primary Examiner* — Kevin Bates
*Assistant Examiner* — Nazia Naoreen
(74) *Attorney, Agent, or Firm* — Tong, Rea, Bentley & Kim, LLC (57) ABSTRACT

A resource assignment capability is presented. A resource specification associated with a plurality of elements is received. The resource specification includes, for each of the elements, a resource request including an indication of a quantity of resources requested by the element and a resource offer including an indication of a quantity of resources offered by the element for use by one or more other elements. A resource assignment, including an indication of an association between the resources requests and the resource offers, is determined using a resource assignment process. The resource assignment process may be a greedy assignment process or a maximum flow resource assignment process. The maximum flow resource assignment process includes constructing a maximum flow resource graph based on the one or more resource specifications and applying a maximum flow process to the maximum flow resource graph to determine thereby the resource assignment.

20 Claims, 7 Drawing Sheets

(56) References Cited

OTHER PUBLICATIONS

"The Open Source Cloud Platform," Eucalyptus http://open.eucalyptus.com/, Printed Feb. 9, 2012.
T. Wood, P. Shenoy, A. Gerber, K. Ramakrishnan, and J. V. der Merwe, "The Case for Enterprise-Ready Virtual Private Clouds," Usenix HotCloud, 2009.
"How to Set Up Port Forwarding on a Router," http://www.wikihow.com/Set-up-Port-Forwarding-on-a-Router, printed Feb. 9, 2012.
"Port Forward," https://secure.portforward.com/store/pfconfig.cgi, printed Feb. 10, 2012.
"Universal Plug and Play," http://en.wikipedia.org/wiki/Universal_Plug_and_Play, printed Feb. 9, 2012.
"Internet Gateway Device Protocol," http://en.wikipedia.org/wiki/Internet_Gateway_Device_Protocol, printed Feb. 9, 2012.
"PlanetLab," http://www.planet-lab.org/, printed Feb. 10, 2012.
"NanoDataCenters," Information Society Technologies, http://nanodatacenters.eu/, printed Feb. 9, 2012.

* cited by examiner

Pseudocode 1 Greedy Process for Resource Assignments input An Instance of the Matchmaking Problem $M = (n, O, R, U)$
    output Feasible assignment A for $M$
1: procedure GREEDY$(n, O, R, U)$
2:     DO $\leftarrow$ O; DR $\leftarrow$ R
3:     for $i \leftarrow 1$ to $n$ do
4:         for $j \leftarrow 1$ to $n$ do
5:             if $j = i$ then
6:                 $c \leftarrow 0$
7:             else
8:                 $c \leftarrow \min(DR(i), DO(j), U(i,j))$
9:             end if
10:           $A(i,j) \leftarrow c$
11:           $DR(i) \leftarrow DR(i) - c$; $DO(j) \leftarrow DO(j) - c$
12:         end for
13:     end for
14:     return A
15: end procedure

FIG. 7A

Pseudocode 2 Maximum Flow Process for Resource Assignment input An Instance of the Matchmaking Problem $M = (n, O, R, U)$
    output Request-Optimal Assignment A for $M$
1: procedure OPTIMAL-MATCHMAKING$(M)$
2:     $f \leftarrow$ MAX-FLOW$(G(M))$
3:     return $A(f)$
4: end procedure

APPARATUS AND METHOD FOR MATCHING OFFERS AND REQUESTS FOR SHARING OF RESOURCES

TECHNICAL FIELD

The invention relates generally to sharing of resources and, more specifically but not exclusively, to matching of offers and requests to facilitate sharing of resources.

BACKGROUND

In many types of environments, it is necessary or desirable to share resources amongst entities.

SUMMARY

Various deficiencies in the prior art are addressed by embodiments for facilitating resource sharing.

In one embodiment, an apparatus includes a processor and a memory communicatively coupled to the processor. The processor is configured to receive one or more resource specifications associated with a plurality of elements, where the one or more resource specifications include, for each of the elements, a resource request including an indication of a quantity of resources requested by the element and a resource offer including an indication of a quantity of resources offered by the element for use by one or more other elements. The processor is configured to construct a maximum flow resource graph based on the one or more resource specifications. The processor is configured to apply a maximum flow process to the maximum flow resource graph to determine thereby a resource assignment, where the resource assignment includes an indication of an association between the resources requests and the resource offers.

In one embodiment, a method includes using a processor for receiving one or more resource specifications associated with a plurality of elements, constructing a maximum flow resource graph based on the one or more resource specifications, and applying a maximum flow process to the maximum flow resource graph to determine thereby a resource assignment. The one or more resource specifications include, for each of the elements, a resource request including an indication of a quantity of resources requested by the element and a resource offer including an indication of a quantity of resources offered by the element for use by one or more other elements. The resource assignment includes an indication of an association between the resources requests and the resource offers.

In one embodiment, an apparatus includes a processor and a memory communicatively coupled to the processor. The processor is configured to receive one or more resource specifications associated with a plurality of elements. The one or more resource specifications include, for each of the elements, a resource request including an indication of a quantity of resources requested by the element, a resource offer including an indication of a quantity of resources offered by the element for use by one or more other elements, and upper-bound constraint information indicating one or more upper-bound constraints on an amount of resources to be hosted for the element at one or more other elements. The processor is configured to determine, using a resource assignment process, a resource assignment including an indication of an association between the resources requests and the resource offers.

In one embodiment, a method includes using a processor for receiving one or more resource specifications associated with a plurality of elements and determining, using a resource assignment process, a resource assignment. The one or more resource specifications include, for each of the elements, a resource request including an indication of a quantity of resources requested by the element, a resource offer including an indication of a quantity of resources offered by the element for use by one or more other elements, and upper-bound constraint information indicating one or more upper-bound constraints on an amount of resources to be hosted for the element at one or more other elements. The resource assignment includes an indication of an association between the resources requests and the resource offers.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

In general, a resource assignment capability is depicted and described herein, although various other capabilities also may be presented herein.

Although primarily depicted and described herein within the context of facilitating sharing of specific types of resources (e.g., computing resources) in specific types of environments (e.g., communications environments), it will be appreciated that various embodiments of the resource assignment capability may be employed to facilitate sharing of other types of resources and, similarly, also may be employed to facilitate sharing of resources in other types of environments.

Figure 1:
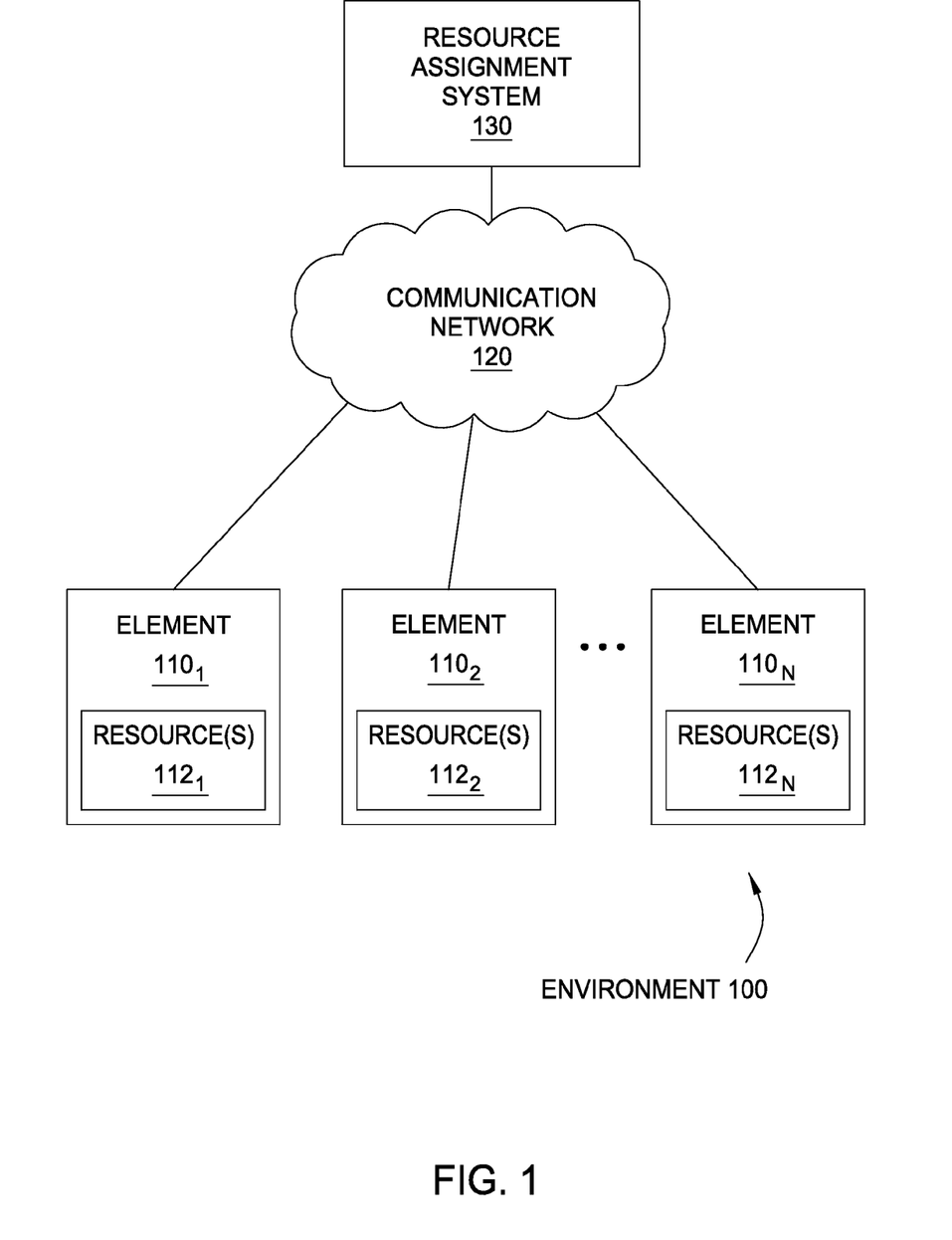
FIG. 1 depicts a high-level block diagram of an environment supporting sharing of resources between elements.

FIG. 1 depicts a high-level block diagram of an environment supporting sharing of resources between elements.

The environment 100 includes a plurality of elements $110_1$-$110_N$ (collectively, elements 110), a communication network 120, and a resource assignment system 130.

The elements 110 are configured to operate within environment 100. The elements $110_1$-$110_N$ each include resources $112_1$-$112_N$ (collectively, resource 112), respectively. In general, each element 110 is configured to offer its own resources 112 for use by other elements 110 (denoted herein as a resource offer) and is configured to request use of resources 112 of other elements 110 (denoted herein as a resource request). The elements 110 are configured to send resource offers and resource requests to resource assignment system 130 for use by resource assignment system 130 to determine assignment of resources between the elements 110 based on the resource offers and resource requests of the elements 110.

The communication network 120 supports communication between elements 110 and resource assignment system 130.

The resource assignment system 130 is configured to receive resource offers and resource requests from elements 110, and to process the resource offers and resource requests to determining a resource assignment based on the resource offers and resource requests. The resource assignment system 130 is configured to determine the resource assignment in a manner tending to satisfy the resource requests. The resource assignment includes an indication of an association between the resources requests and the resource offers (which also may be referred to herein as a matching of the resource requests and resource offers). The resource assignment may include: (1) for each element requesting one or more resources, an indication of the number of requested resources granted to that element and identification of the other element(s) from which the granted resources are to be provided and (2) for each element offering one or more resources, an indication of the number of offered resources to be used by one or more other elements and identification of the other element(s) to which the offered resources are to be provided. The operation of resource assignment system 130 in performing such functions is described in additional detail below.

As described herein, environment 100 may include any suitable type of environment and, thus, elements 110 may be any suitable types of elements and, similarly, resources 112 of elements 110 may be any suitable types of resources.

In one embodiment, environment 100 includes a network of a telecommunications service provider and elements 110 are nodes of the network which may offer resources for use by other nodes and/or request use of resources of other nodes. In this embodiment, for example, the elements 110 may be switches, routers, servers, and the like. Similarly, in this embodiment, for example, the resources 112 may include one or more of computing resources, storage resources, network resources, and the like.

In one embodiment, environment 100 includes a system of personal clouds and elements 110 are nodes of personal clouds of the system of personal clouds where, for each personal cloud, nodes of the personal cloud may offer resources for use by nodes of other personal clouds and/or request use of resources of nodes of other personal clouds. In this embodiment, for example, the elements 110 may be computers of small personal clouds (e.g., home computers of a family where the personal cloud is established for a family, business computers of a business where the personal cloud is established for a business, and the like). Similarly, in this embodiment, for example, the resources 112 may include virtual resources typically associated with cloud systems (e.g., virtual computing resources, virtual storage resources, and the like).

In one embodiment, environment 100 includes a commodity market and elements 110 represent commodity trading entities of the commodity market or elements configured to communicate on behalf of commodity trading entities of the commodity market. In this embodiment, for example, the elements 110 may represent people trading within the commodity market and or computing devices used by and/or representing people trading within the commodity market. Similarly, in this embodiment, for example, the resources 112 may include any suitable types of commodities which may be exchanged within a commodity market.

It will be appreciated that the foregoing examples of environment represent merely a few of the different types of environments within which the resource assignment capability may be used.

Figure 2:
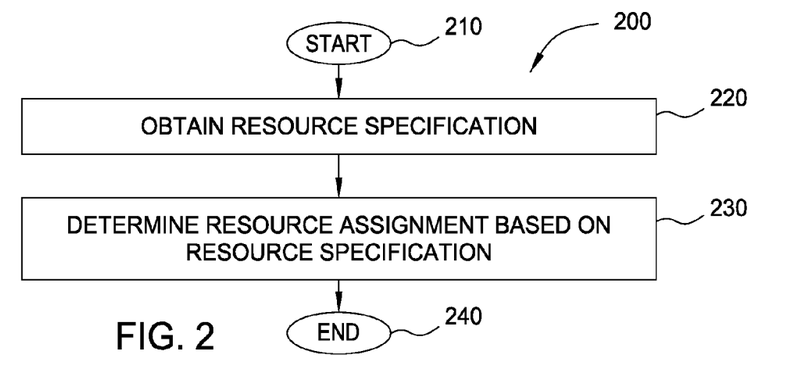
FIG. 2 depicts one embodiment of a method for determining a resource assignment.

FIG. 2 depicts one embodiment of a method for determining a resource assignment.

At step 210, method 200 begins.

At step 220, a resource specification is obtained. The resource specification specifies the resource offers and resource requests to be processed for determining the resource assignment. The resource specification may be obtained in any suitable manner (e.g., retrieved from memory where the resource specification was previously constructed, constructed on-the-fly as resource offers and resource requests are received, and the like as well as various combinations thereof). An exemplary method for constructing a resource specification using resource requests and resource offers is depicted and described with respect to FIG. 3. The resource specification may be specified in any suitable manner.

At step 230, a resource assignment is determined based on the resource specification. The resource assignment specifies matching of the resource offers and the resource requests. The resource specification includes an indication of an association between the resources requests and the resource offers. The resource assignment may be determined using a greedy process or using a maximum flow process. An exemplary method for determining a resource assignment using a maximum flow process is depicted and described with respect to FIG. 3. It is noted that a resource assignment also may be referred to herein as a matchmaking assignment.

Figure 3:
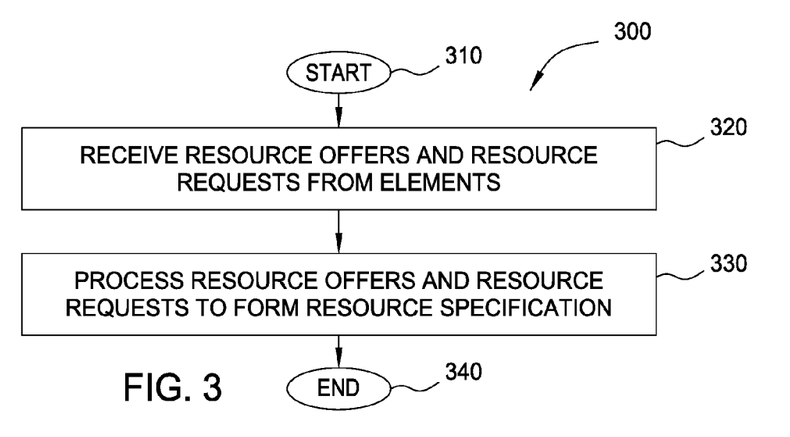
FIG. 3 depicts one embodiment of a method for using resource requests and resource offers to construct a resource specification.

At step 240, method 200 ends. FIG. 3 depicts one embodiment of a method for using resource requests and resource offers to construct a resource specification. It is noted that method 300 of FIG. 3 is suitable for use as step 220 of FIG. 2.

At step 310, method 300 begins.

At step 320, resource offers and resource requests are received from elements of the environment.

In general, a resource offer from an element specifies a number of units of resources that the element is willing to host on behalf of other elements and a resource request from an element specifies a number of units of resources that the element is requesting be hosted on one or more other elements. It is noted that when an element does not request any resources this may be considered to be a resource request for zero resources and, similarly, that when an element does not offer any resources this may be considered to be a resource offer of zero resources.

In one embodiment, the resource requests also may specify upper-bound information. The upper-bound information for an element i specifies the maximum number of resource units that element i is willing to have hosted at any given other element. The upper-bound information may be specified at any suitable granularity. For example, the upper-bound information may be specified for all elements using a single value (e.g., no more than x units of resources may be hosted at any other element). For example, the upper-bound information may be specified for sets of elements using multiple values (e.g., no more than x units of resources may be hosted at elements located within a geographic region and no more than y units of resources may be hosted at elements outside of the geographic region). For example, the upper-bound information may be specified for the n elements using n values, respectively.

In one embodiment, the resource requests also may specify cost information. The cost information for an element i specifies the cost that hosting element i charges other elements for each unit of resource hosted by hosting element i for the other elements. The cost information may be specified at any suitable granularity. For example, the cost information may be specified for all elements using a single value (e.g., x cost will be charged for each of the other elements). For example, the cost information may be specified for sets of elements using multiple values (e.g., x cost will be charged for each element in a first set of elements and y cost will be charged for each element in a second set of elements). For example, the cost information may be specified for the n elements using n values, respectively.

In one embodiment, the resource requests also may specify upper-bound information and cost information, each of which may be provided as described above.

The resource offers and resource requests may be received in any suitable manner. In one embodiment, an element may provide the resource offer and the resource request together in a single message. In one embodiment, an element may provide the resource offer and the resource request in separate messages. The resource offers and resource requests may be provided in any other suitable manner.

It is noted that when an element does not request any resources this may be considered to be a resource request for zero resources and that when an element does not offer any resources this may be considered to be a resource offer of zero resources. It is further noted that, when upper-bound constraint information is to be included in a resource specification, if an element does not specify an upper-bound constraint then this may be considered to be an upper-bound constraint of infinity (or the total amount of resources requested by the element). It is further noted that, when cost information is to be included in a resource specification, if an element does not specify a cost then this may be considered to be a cost of zero. In other words, a resource specification may be considered to include the relevant types of information (requests and offers, and, optionally, one or both of upper-bounds and costs) for each of the elements even where the elements do not specifically include such information in the resource request/offer information that they provide.

At step 330, the resource offers and resource requests are processed to form a resource specification. The resource specification may be represented in any suitable manner (e.g., using one or more vectors, one or more arrays, one or more other data structures, and the like, as well as various combinations thereof). In one embodiment, the resource specification for n elements may be represented as a set of vectors and matrices as follows: (1) the resource offers of the n elements are specified using a one-dimensional offer vector O having n entries where the entry O(i) for element i specifies the number of resource units that element i is willing to host on behalf of other elements, and (2) the resource requests of the n elements are specified using a one-dimensional request vector R having n entries where the entry R(i) for element i specifies the number of resource units that element i is requesting to be hosted on other elements. In this embodiment, for example, where the resource offers also include upper-bound limits, the resource specification for the n elements also may include a two-dimensional upper-bound matrix U where the entry U(i, j) specifies the maximum number of resource units that element i is willing to have hosted (on its behalf) at element j. In this embodiment, for example, where the resource offers also include cost information, the resource specification for the n elements also may include a two-dimensional cost matrix C where the entry C(i, j) specifies the cost that hosting element i charges requesting element j for each unit of resource hosted by hosting element i for requesting element j. It is noted that the resource specification may be represented using fewer or more data structures, different types of data structures, and the like, as well as various combinations thereof.

Figure 4:
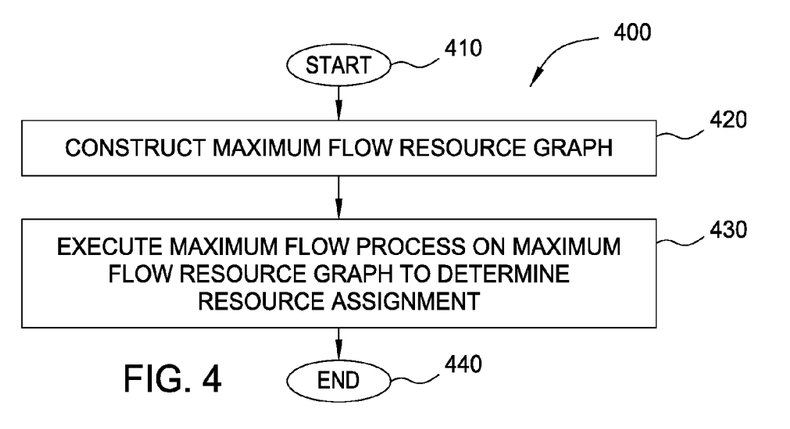
FIG. 4 depicts one embodiment of a method for using a maximum flow process to determine a resource assignment.

At step 340, method 300 ends. FIG. 4 depicts one embodiment of a method for using a maximum flow process to determine a resource assignment. It is noted that method 400 of FIG. 4 is suitable for use as step 230 of FIG. 2.

At step 410, method 400 begins.

At step 420, a maximum flow resource graph is constructed. The maximum flow resource graph is constructed based on the resource offers and resource requests (e.g., based on a resource specification configured to represent the information associated with the resource offers and the resource requests). An exemplary method for constructing a maximum flow resource graph is depicted and described with respect to FIG. 5.

At step 430, a maximum flow process is executed on the maximum flow resource graph to determine the resource assignment.

At step 440, method 400 ends.

Figure 5:
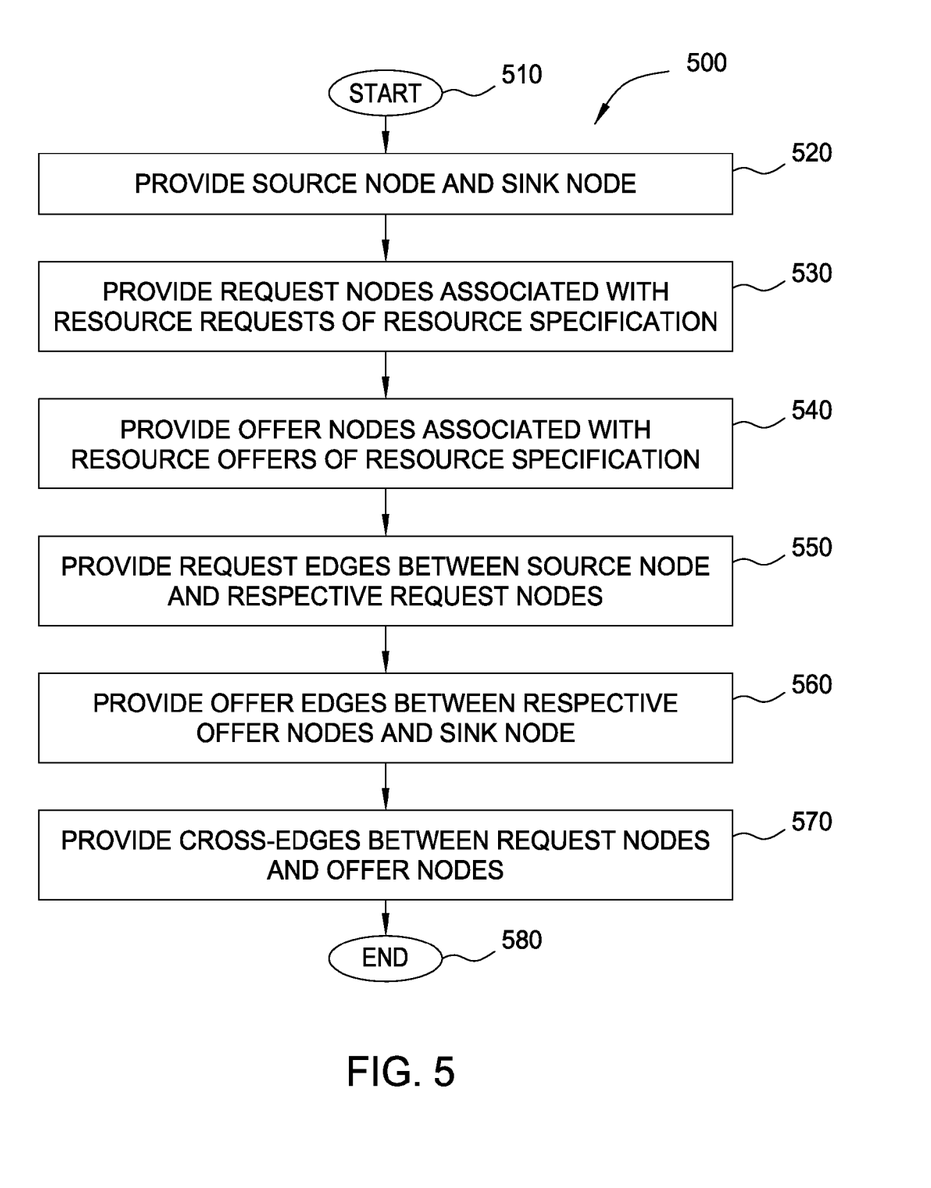
FIG. 5 depicts one embodiment of a method for using a resource specification to construct a maximum flow graph for use by a maximum flow process.

FIG. 5 depicts one embodiment of a method for using a resource specification to construct a maximum flow graph for use by a maximum flow process. It is noted that method 500 of FIG. 5 is suitable for use as step 420 of FIG. 4.

At step 510, method 500 begins.

At step 520, a source node and a sink node are provided.

At step 530, request nodes, associated with the respective plurality of resource requests of the resource specification, are provided.

At step 540, offer nodes, associated with the respective plurality of resource offers of the resource specification, are provided.

At step 550, request edges are provided between the source node and the respective request nodes. The request edge between the source node and a given request node represents the amount of resources requested in that resource request.

At step 560, offer edges are provided between the respective offer nodes and the sink node. The offer edge between a given offer node and the sink node represents the amount of resources offered in that resource offer.

At step 570, cross-edges are provided between the request nodes and the offer nodes. The request edge between a given request node and a given offer node represents the upper bound of resources which may be provided by the element from which the offer was received as specified by the element from which the request was received.

At step 580, method 500 ends.

Although depicted and described as ending (for purposes of clarity), it will be appreciated that the maximum flow graph, once constructed, may be handled in any suitable manner (e.g., stored for use during execution of the maximum flow process).

Figure 6:
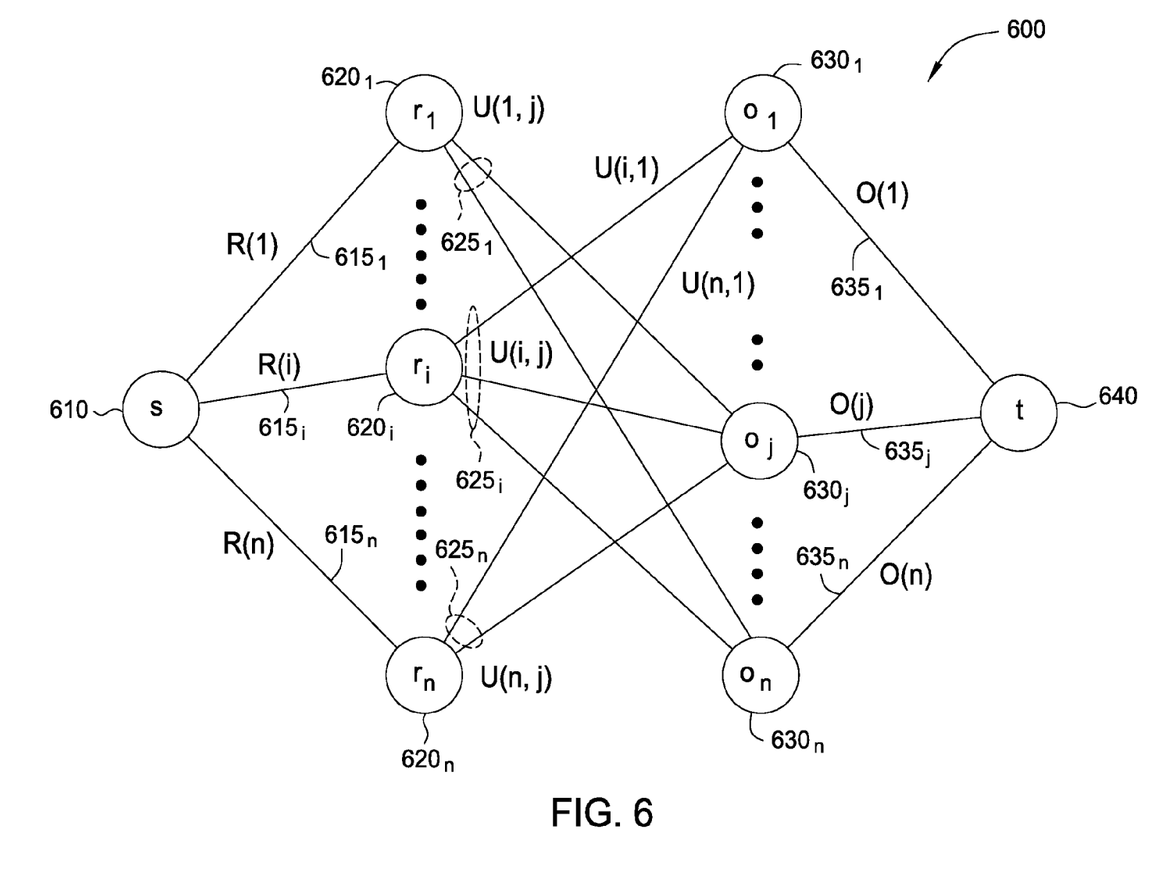
FIG. 6 depicts an exemplary maximum flow graph constructed from a resource specification.

FIG. 6 depicts an exemplary maximum flow graph constructed from a resource specification. In one embodiment, the maximum flow graph 600 of FIG. 6 may be constructed using method 500 of FIG. 5.

The maximum flow graph 600 includes a source node 610, a plurality of request nodes $620_1$-$620_n$ (collectively, request nodes 620), a plurality of offer nodes $630_1$-$630_n$ (collectively, offer nodes 630), and a sink node 640.

The maximum flow graph 600 includes a plurality of request edges $615_1$-$615_n$ (collectively, request edges 615) directed from source node 610 toward request nodes $620_1$-$620_n$, respectively.

The maximum flow graph 600 includes a plurality sets of cross-edges $625_1$-$625_n$ (collectively, sets of cross-edges 625), where the set of cross-edges 625 of a given request node 620 includes n−1 cross edges from request node 620 to n−1 of the offer nodes 630, respectively.

The maximum flow graph 600 includes a plurality of offer edges $635_1$-$635_n$ (collectively, offer edges 635) directed offer nodes $630_1$-$630_n$ toward sink node 640, respectively.

It is noted that the operation of methods 200, 300, 400, and 500 of FIGS. 2, 3, 4, and 5, respectively, may be better understood by considering a formal definition and analysis of the matchmaking problem (which also may be referred to herein as a resource assignment problem) and associated matchmaking solution (which also may be referred to herein as a resource assignment solution or resource assignment) within the context of a personal cloud environment in which multiple personal clouds each include one or more nodes offering and/or requesting cloud resources. A formal definition and analysis of the matchmaking problem and associated matchmaking solution follows.

Matchmaking Problem

Notation

Let N denote the set of natural numbers and let $R^+$ denote the set of non-negative real numbers. For a matrix A, we use A(i, j) to denote its i,j-entry. A vector V of length n is regarded as a 1×n matrix with the i'th value of the vector V(i) as shorthand for V(1,i). Let 1 denote the vector defined by 1(i)=1 for all i, with its length clear from the context. Let AB denote the matrix product of matrices A and B, and let AT denote the transpose of the matrix A. Finally, the pointwise ordering on matrices is defined as A≤B if and only if A(i,j)≤B(i,j) for all i, j.

Specification of Offers and Requests

As described herein, the formulation of the resource sharing problem is agnostic to the kind of resource that is shared (e.g., CPU, storage, bandwidth, and the like). Thus, a "resource unit" is used to represent some granularity at which a resource of interest may be shared (e.g., any size/amount of the resource of interest which may be represented as a discrete multiple of such resource units of the resource of interest). For storage resources, for example, the associated resource unit of storage resources may be 1 mega-byte, 2 mega-bytes, or any other suitable granularity. For bandwidth resources, for example, the associated resource unit of bandwidth resources may be 1 mega-byte per second, 4 mega-bytes per second, or any other suitable granularity. A further assumption is made that each node of a personal cloud is capable of "hosting" a number of such resource units and is capable of requesting a number of such resource units to be hosted at other nodes of other personal clouds. For a given node of a personal cloud, the resource units requested by the given node may be distributed across a set of other nodes of other personal clouds (and, in at least some embodiments, the given node is able to constrain the distribution of the resource units across the other nodes by specifying, for each of the other nodes, an upper bound on the number of resource units that may be hosted at that other node). It is noted that the specification of resource requests and resource offers may be better understood by considering the following definition.

A definition of an instance of the matchmaking problem (denoted as Definition 1) follows. An instance of the matchmaking problem is defined to be M=(n, O, R, U), where n∈N, O and R are vectors of length n, U is an n×n matrix, and O(i), R(i), U(i, j)∈N for 1≤i; j≤n. In the above definition, n is the number of nodes, O is the offer vector with O(i) giving the number of resource units that node i offers to host (on behalf of all remote nodes), and R is the request vector with R(i) giving the total number of resource units that node i requests to be hosted (across all remote nodes). Finally, U is the upper-bound matrix with U(i, j) giving the maximum number of resource units that node i permits to have hosted (on its behalf) at node j. The following examples show how upper-bound constraints are general enough to uniformly capture two representative resource sharing scenarios of interest as special instances of this definition of the matchmaking problem.

A first example is related to unconstrained requests. A simple example of a resource request is where the distribution of resources across remote nodes is unconstrained. For example, a node i may request k resource units with the k resource units distributed in any fashion across the remote nodes. This case can be specified as an unbounded upper-bound of infinity. As such, the row i of the matrix U will be defined by U(i, j)=∞ for all j, and the resource vector by R(i)=k.

A second example is related to replication for fault-tolerance. Consider an exemplary scenario where a node wishes to use storage resources in the cloud for the purposes of fault-tolerant replication. More specifically, assume that a node i has a file that (1) requires one unit of storage and (2) must be replicated k times in the cloud. From the perspective of fault-tolerance, it is important that the k replications be done at distinct nodes. This can be specified as a resource request of k storage resource units with an upper-bound of one unit of storage at all nodes, i.e., R(i)=k and U(i, j)=1 for all j. In this example, the result is that a maximum of one unit of storage will be allocated, on behalf of node i, at any remote node. Thus, in this example, the resource request of k units can only be satisfied by a distribution where the k units are allocated to k distinct remote nodes. More generally, assume that node i sends a resource request for m resource units and is to be stored with a replication factor of at least k (i.e., its successful access should be able to survive up to k−1 node failures). This can be achieved by a resource request requesting mk units and specifying an uppe-bound of m at any remote node, i.e., R(i)=mk and U(i, j)=m for all j. Further, if the replicas are to be stored at a sufficiently large geographic distance from the requesting node i, then the resource request can specify U(i, j)=0 for all nodes j that are "close" to the requesting node i (within the threshold of geographic distance).

It is noted that the foregoing definition allows various constraints on the requested distribution of requested resources. For example, it is possible to mix and match the various types of constraints detailed in the two examples described above to allow one node (node i) to request an unconstrained distribution and another node (node j) to have a resource request for the purposes of replication. In this case, the i'th row of the matrix U would be as in the first example (unconstrained requests) and the j'th row of the matrix U would be as in the second example, (replication for fault-tolerance).

Resource Assignments

A resource assignment, which includes an indication of an association between resources requests and resource offers (e.g., specifying allocation of resource requests across the nodes in the personal cloud based on resource offers of nodes in the personal cloud), is determined. As noted hereinabove, a resource assignment also may be referred to herein as a matchmaking assignment as it is a resource assignment determined based on the matchmaking problem.

In one embodiment, the resource assignment is represented as a two-dimensional matrix A with the value $A(i, j)$ giving the number of resource units of node i that are hosted on node j. In at least some embodiments, the hosting of resources is intended to be remote (i.e., resources of a given personal cloud cannot be self-hosted within that given personal cloud), such that there is no self-hosting (i.e., the entries $A(i, i)=0$ for all i).

A definition of a resource assignment (denoted as Definition 2), for at least one embodiment, follows. A resource assignment over n nodes is an n×n matrix A with $A(i, j) \in N$ for $1 \le j \le n$ such that $A(i; i)=0$ for $1 \le i \le n$. For an instance of the matchmaking problem, a resource assignment is feasible if it respects the constraints embodied in the instance. For an assignment A, the number of resource units assigned to be hosted at a node i is the sum of the entries of the i'th column in A, (i.e. $\Sigma_j A(j,i)$), which can be more succinctly expressed as the vector obtained from the matrix product 1A whose i'th entry gives the total number of resource units assigned to be hosted at node i. This is to be no more than the number of units that node i offers to host. Similarly, the number of resource units that are hosted for a node i is given by the sum of the entries in the i'th row which can be expressed as the vector $1A^T$. These values are to be no more than the corresponding number of resource units requested. Additionally, it is noted that, where upper-bound constraints are specified, the assignment must respect those upper-bound constraints.

A definition of a feasible resource assignment (denoted as Definition 3), for at least one embodiment, follows. Let $M=(n, O, R, U)$ be an instance of the matchmaking problem. A feasible resource assignment for M over n nodes is a resource assignment that satisfies the following conditions:

$1A \le O$ (Offer Constraints)

$1A^T \le R$ (Request Constraints)

$A \le U$ (Upper-Bound Constraints)

A resource assignment is deemed to be request-satisfying if it allocates the full amount of all requests, i.e., completely meets all requests.

A definition of a request-satisfying resource assignment (denoted as Definition 4), for at least one embodiment, follows. Let $M=(n, O, R, U)$ be an instance of the matchmaking problem. A request-satisfying assignment is a feasible resource assignment A for M such that $1A^T=R$. The instance M is request-satisfiable if it has a request-satisfying assignment.

Request-Satisfying Resource Assignments

In one embodiment, request-satisfying resource assignments are computed. It is noted that request-satisfying resource assignments can be cast as special instances of assignments meeting a more general optimization criterion.

A definition of request-optimal assignments (denoted as Definition 5), for at least one embodiment, follows. Let $M=(n, O, R, U)$ be an instance of the matchmaking problem and let A be a feasible assignment for the instance of the matchmaking problem.

The request-deficiency of the assignment A with respect to the instance M is defined as the vector $\delta_R(A,M)=R-1A^T$ and the cumulative request-deficiency is defined as the value $\Delta_R(A, M)=\delta_R(A, M)1^T$.

A request-optimal assignment A for M is a feasible assignment for M for which the value $\Delta_R(A, M)$ is minimum among all feasible assignments.

In the above definition, the i'th entry of the vector $\delta_R(A,M)$ gives the amount of node i's request that is left unallocated by the assignment A. As a result, the value $\Delta_R(A, M)$ gives the total amount of unmet resource units across the requests of all nodes. A request-optimal assignment is therefore one that leaves the least aggregate amount of unmet request.

A proposition related to optimal resource assignments (denoted as Proposition 1), for at least one embodiment, follows. The proposition shows that request-satisfying assignments are request-optimal assignments of a special form.

The proposition, that request-satisfying assignments are request-optimal assignments, is defined as follows. Let M be an instance of the matchmaking problem. Then A is a request-satisfying assignment for M if and only if it is request-optimal for M and $\Delta_R(A, M)=0$.

The proposition, that request-satisfying assignments are request-optimal assignments, may be proven as follows. Suppose that A is request-satisfying. Then, $1A^T=R$ and, thus, $\Delta_R(A, M)=0$. By the Request Constraints condition, $\Delta_R(B, M) \ge 0$ for any feasible assignment B and, thus, A is request-optimal. Conversely, suppose that A is request-optimal and $\Delta_R(A, M)=0$. Since A is feasible, it follows from the Request Constraints condition that $\delta_R(A,M) (i) \ge 0$ for all i and, thus, that $\Delta_R(A, M)=0$ if and only if $\delta_R(A,M) (i)=0$ for all i. From this, it follows that A is request-satisfying.

The proposition indicates that, in order to compute request-satisfying assignments (and check whether a given instance of the matchmaking problem is request-satisfiable), it suffices to solve the problem of computing a request-optimal assignment. Furthermore, while some instances of the matchmaking problem may have no request-satisfying assignments, all instances have a request-optimal assignment. Thus, the matchmaking problem may be represented using this more general optimization problem.

A definition of the matchmaking problem (denoted as Definition 6), for at least one embodiment, follows. Given an instance of the matchmaking problem M, compute a request-optimal assignment A for M.

Offer-Centric Matchmaking Problem and Duality

The notion of a satisfying assignment (Definition 4) and the matchmaking problem (Definition 6) defined so far are request-centric in that the objective metrics considered are with respect to meeting requested resources. It is noted such metrics could have alternatively been considered with respect to offers, as follows.

A definition of the matchmaking problem from the perspective of offers (denoted as Definition 7), for at least one embodiment, follows. Let $M=(n, O, R, U)$ be an instance of the matchmaking problem and let A be a feasible assignment for the instance of the matchmaking problem.

The assignment A is offer-satisfying if $1A=O$. The instance M is offer-satisfiable if it has an offer-satisfying assignment.

The offer-deficiency of the assignment A with respect to the instance M is defined as the vector $\delta_O(A,M)=O-1A$, and the cumulative offer-deficiency is defined as the value $\Delta_O(A, M)=\delta_O(A, M)1^T$.

An offer-optimal assignment A for M is a feasible assignment for M for which the value $\Delta_O(A, M)$ is minimum among all feasible assignments.

A proposition related to request-offer duality (denoted as Proposition 2), for at least one embodiment, follows. The proposition shows a precise sense in which the request-centric and offer-centric notions are dual to one another.

The proposition regarding request-offer duality is defined as follows. For any instance M=(n, O, R, U) of the matchmaking problem, define its dual instance to be MT=(n, R, O, $U^T$). For any n×n matrix A, we have the following: (1) A is a feasible assignment for M if and only if AT is a feasible assignment for MT, (2) $\delta_R(A,M)=\delta_O(A^T,M^T)$ and $\delta_O(A,M)=\delta_R(A^T,M^T)$, and (3) A is a request-optimal assignment for M if and only if $A^T$ is an offer-optimal assignment for $M^T$ and A is an offer-optimal assignment for M if and only if $A^T$ is a request-optimal assignment for $M^T$.

The dual instance, as given by the above proposition, simply corresponds to exchanging the role of requesting and offering nodes. The proof of Proposition 2 is straightforward; however, it shows that the request-centric metrics can be reduced to the offer-centric metrics and that the offer-centric metrics can be reduced to the request-centric metrics and, further, that the associated optimization problems do not have to be solved separately. For example, one can find an offer-optimal assignment by computing a request-optimal assignment for the dual instance of the matchmaking problem. Thus, it suffices to restrict attention to the request-centric version of the problem.

Matchmaking Problem with Costs

In one embodiment, the matchmaking problem can be extended to encompass a scenario in which host nodes charge requesting nodes for the amount of resources hosted at the hosting nodes. To this end, an offering node specifies a cost per unit of resource to be hosted by the offering node. In one such embodiment, the hosting/offering node may charge different costs to different requesting nodes. In one embodiment, such cost quantities can be naturally specified as a two dimensional matrix C, with the entry C(i, j) indicating the cost that hosting node i charges requesting node j for each unit of resource hosted by hosting node i for requesting node j. Note that this still allows a hosting node to charge a uniform cost, in which case the particular row corresponding to the hosting node would have identical entries. For a particular resource assignment, A, the cost paid by a requesting node i to hosting node j is then A(i, j)C(j, i) and the total cost paid by requesting node i to all of the hosting nodes is $\Sigma_j A(i, j)C(j,i)$, which can be more succinctly expressed as the diagonal entry (i, i) of the matrix product AC. It is noted that, following these considerations, an associated definition may be provided.

A definition of an instance of the matchmaking problem with costs (denoted as Definition 8), for at least one embodiment, follows. The instance of the matchmaking problem with costs is defined to be M=(n, O, R, U, C), where (n, O, R, U) is an instance of the matchmaking problem and C is an n x n matrix with $C(i, j) \in \mathbb{R}^1$ for $1 \le i; j \le n$. The cost vector for a feasible assignment A is defined by cost(A)(i)=(A C)(i, i) for $1 \le i \le n$ and the total cost given by $COST(A)=cost(A)1^T$. As described for the instance of the matchmaking problem without costs, request-optimal assignments are computed. The computation of request-optimal assignments in the presence of costs is performed in a manner for minimizing the total cost incurred by all requesting nodes. Thus, the matchmaking problem with costs may be expressed using the following definition.

A definition of the matchmaking problem with costs (denoted as Definition 9), for at least one embodiment, follows. For the matchmaking problem with costs, given an instance M of the matchmaking problem with costs, compute a request-optimal assignment A with COST(A) minimum among all request-optimal assignments.

Resource Assignment Processes

Greedy Resource Assignment Process

In one embodiment, the determination of the resource assignment is performed using a greedy process. In this embodiment, the resource assignment is determined by considering each request in turn satisfying each request in by considering each hosting node in turn and assigning as much of the requested units as possible to the hosting node. Exemplary pseudocode for a greedy process is depicted and described in FIG. 7A.

Figure 7A:
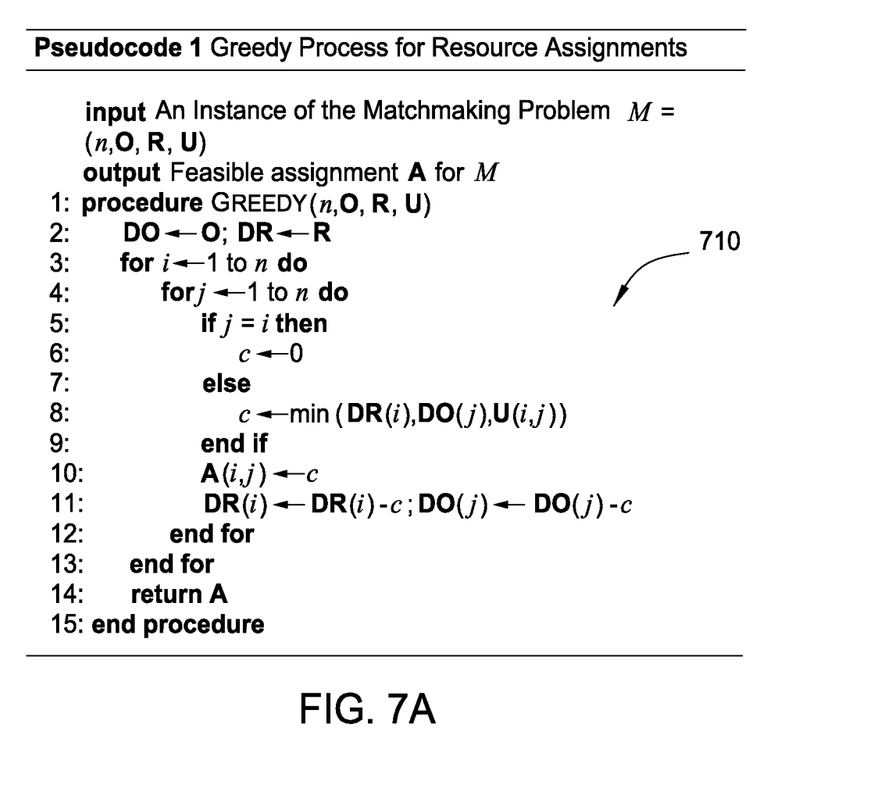
FIG. 7A depicts exemplary pseudocode for a greedy process configured to determine a resource assignment.

FIG. 7A depicts exemplary pseudocode for a greedy process configured to determine a resource assignment. As depicted in FIG. 7A, the input to the exemplary pseudocode 710 is an instance of the matchmaking problem and the output of the exemplary pseudocode 710 is a feasible resource assignment for the instance of the matchmaking problem. The exemplary pseudocode 710 uses two vectors (denoted as DO and DR) to maintain the outstanding offer still available and outstanding request still to be satisfied, which are initialized to the vectors O and D in Line 2 of exemplary pseudocode 710. In exemplary pseudocode 710, the loop beginning on Line 3 considers each requesting node i and the loop beginning on Line 4 considers each offering node j. In exemplary pseudocode 710, Line 8 corresponds to the greedy calculation of assigning as many resources to the offering node as is consistent with the remaining offer available, remaining request to be satisfied, and upper-bound constraint. In exemplary pseudocode 710, at the end of both "for" loops in Line 14, all entries in the matrix A are populated (i.e., the matrix A is returned as the resource assignment).

It is noted that, while the greedy process always produces a feasible resource assignment, the greedy process almost always fails to produce the optimal resource assignment even for simple instances of the matchmaking problem (e.g., ones in which there are no upper-bound constraints on the resource assignment). This may be seen from a simple example, which follows.

As an example, consider a matchmaking problem instance M=(3; (1; 1; 2); (1; 1; 2);U) where U is an unconstrained matrix (i.e., U(i, j)=∞ for all i,j=1, 2, 3). That is, nodes 1 and 2 both request and offer 1 resource unit and node 3 requests and offers 2 resource units. Using the greedy process, the 1 resource unit requested by node 1 is assigned to node 2 and the 1 resource unit requested by node 2 is assigned to node 1. As a result, upon reaching node 3 in the greedy process, the values DO(1) and DO(2) will both be 0, and, thus, none of resources requested by node 3 can be assigned to nodes 1 or 2.

Thus, the resource assignment that is returned (and which has a cumulative request-deficiency of 2) is given by:

$$\begin{pmatrix} 0 & 1 & 0 \\ 1 & 0 & 0 \\ 0 & 0 & 0 \end{pmatrix}$$

In this example, however, a request-satisfying resource assignment (having a cumulative request-deficiency of 0) exists, and is given by:

$$\begin{pmatrix} 0 & 0 & 1 \\ 0 & 0 & 1 \\ 1 & 1 & 0 \end{pmatrix}$$

In this request-satisfying resource assignment, the resource requests of nodes 1 and 2 are assigned to node 3, and resource request of node 3 is assigned to nodes 1 and 2 (i.e., 1 resource unit each). Thus, the resource assignment returned by the greedy process is not request-optimal.

Maximum Flow Resource Assignment Process

In one embodiment, the determination of the resource assignment is performed using a maximum flow process.

In one embodiment, a resource assignment process based on a reduction to a maximum flow problem (also referred to herein as a Maximum Flow Process for Resource Assignment) is configured to solve the matchmaking problem of Definition 6.

For any instance M of the matchmaking problem, a flow-graph G(M) is constructed as defined below.

A definition of the flow graph for matchmaking (denoted as Definition 10), for at least one embodiment, follows. Let M=(n, O, R, U) be an instance of the matchmaking problem, and define its corresponding flow graph G(M)=(V, E, s, t, c), where:

(1) Nodes $V=\{s\} \cup V_1 \cup V_2 \cup \{t\}$ with $V_1=\{r_i | 1 \leq i \leq n\}$ and $V_2=\{o_i | 1 \leq i \leq n\}$;

(2) Edges $E=E_1 \cup E_2 \cup E_3$ with $E_1=\{s\} \times V_1$, $E_2=\{(r_i, o_j) | 1 \leq i, j \leq n, i \neq j\}$, and $E_3=V_2 \times \{t\}$; and (3) Capacity Function c is defined as follows: for an edge $e=(s, r_i) \in E_1$, define $c(e)=R(i)$; for any edge $e=(r_i, o_j) \in E_2$, define $c(e)=U(i, j)$; and for an edge $e=(o_i, t) \in E_3$, define $c(e)=O(i)$.

An exemplary flow-graph constructed in accordance with Definition 10 is illustrated in FIG. 6. As described with respect to FIG. 6, the flow-graph 600 includes: (1) a source node s and a sink node t, (2) "request" nodes ($r_1$-$r_n$) and "offer" nodes ($o_1$-$o_n$), (3) edges from s to each of the request nodes (edges in E1 of Definition 10) with capacities given by the request vector R, (4) cross-edges from request nodes to offer nodes (edges in E2 of Definition 10) except when they correspond to the same node (reflecting no self-hosting) and have capacities given by the upper-bound constraints, and (5) edges from the offer nodes to the sink node (edges in E3 of Definition 10) with capacities determined by the offer vector.

For the instance M of the matchmaking problem, a correspondence is established between feasible assignments for the matchmaking problem instance M and integral flows in the constructed flow-graph G(M).

A definition for correspondence between feasible assignments for the matchmaking problem instance M and integral flows in the constructed flow-graph G(M) (denoted as Definition 11), for at least one embodiment, follows. Let M=(n, O, R, U) be an instance of the matchmaking problem. Let its corresponding flow graph G(M)=(V, E, s, t, c) with $E=E_1 \cup E_2 \cup E_3$ as in Definition 10. The definition further includes:

(1) For any assignment B for M, define the function $f(B):E \to N$ as follows: for any $e=(s, r_i) \in E_1$, $f(B)(e)=(1B^T)(i)$; for any $e=(r_i, o_j) \in E_2$, $f(B)(e)=B(i, j)$; for any $e=(o_j, t) \in E_2$, $f(B)(e)=(1B)(j)$.

(2) For any function g: $E \to N$, define the assignment A(g) by $A(g)(i, j)=g(r_i, o_j)$ (for $i \neq j$) and $A(g)(i, i)=0$.

In this definition, the function f maps an assignment for M to a flow in G(M). The flow is obtained by using the assignment to populate flows for the corresponding cross-edges in E2 and using flow-conservation (at $r_1$-$r_n$) to populate flows for edges in E1 and flow-conservation (at $o_1$-$o_n$) to populate flows for edges in E3. The converse function A maps an assignment of integral flows to edges in G(M) to an assignment for M which is obtained simply from the flows on the cross-edges with the entries A(i, i) determined by the no-self-hosting constraint on assignments.

As the following theorem shows, the mappings f(·) and A(·) are a bijection and, furthermore, that they exactly preserve the feasibility constraints on assignments and flows, respectively, with an exact correspondence in the respective objective functions being optimized.

A statement of the theorem follows. For the theorem, (1) let M=(n, O, R, U) be an instance of the matchmaking problem, (2) let G(M)=(V, E, s, t, c) be the corresponding flow graph for the instance of the matchmaking problem, and (3) let B be any assignment for M and let g: $E \to N$ be any function that is flow-preserving. The following properties result:

(1) f(A(g))=g and A(f(B))=B (Bijection), (2) matrix B is a feasible assignment for M if and only if the function f(B) is a flow for the graph G(M) (Assignment Preservation), 3) function g is a flow for the graph G(M) if and only if the matrix A(g) is a feasible assignment for M (Flow Preservation), and 4) $|f(B)|=(R1^T)-\Delta_R(B,M)$ and $\Delta_R(A(g),M)=(R1^T)-|g|$ (Objective Functions).

A proof of the theorem follows. Statement 1 is established by following Definition 11 and the assumption that g is flow-conserving. Statements 2 and 3 are based on the following correspondences: (a) the (Offer Constraints) condition on feasible assignments maps to the conjunction of flow conservation at the nodes $o_i$ and capacity constraints on edges in E3, (b) the (Request Constraints) condition maps to the conjunction of capacity constraints on edges in E1 and flow conservation at the nodes $r_i$, and (c) the (Upper-Bound Constraints) condition maps to capacity constraints on edges in E2. Statement 4 is a straightforward calculation of the respective objective functions.

It may be observed that the flow-graph G(M) has the property that all capacities are integral. It will be appreciated by one skilled in the art that the result on maximum flow is that for any graph with integral capacities, there is a maximum flow that is integral. As a result, the following corollary, which establishes the reduction of the matchmaking problem to the maximum flow problem, is obtained and, further, an efficiently checkable characterization of request-satisfiable instances also is obtained.

A statement of the corollary follows. Let M=(n, O, R, U) be an instance of the matchmaking problem and let f be an integral maximum flow for G(M). Then, A(f) is a request-optimal assignment for M. The assignment A(f) is request-satisfying and the instance M is request satisfiable if and only if the value of the flow $|f|=(R1^T)$. Exemplary pseudocode for a maximum flow process, based on Corollary 1, is depicted and described in FIG. 7B.

Figure 7B:
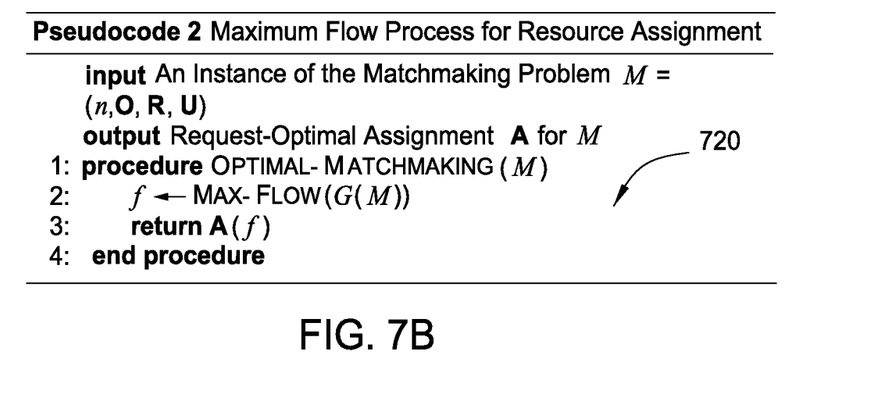
FIG. 7B depicts exemplary pseudocode for a maximum flow process configured to determine a resource assignment.

FIG. 7B depicts exemplary pseudocode for a maximum flow process configured to determine a resource assignment. As depicted in FIG. 7B, the input to the exemplary pseudocode 720 is an instance of the matchmaking problem and the output of the exemplary pseudocode 710 is a request-optimal resource assignment for the instance of the matchmaking problem. The flow graph G(M) in Line 2 of exemplary pseudocode 720 is as in Definition 10, and the assignment A(f) in Line 3 of exemplary pseudocode 720 is given by Definition 11. It is noted that the construction of the graph G(M) takes time linear in the size of the input M with number of vertices being $O(|M|^{1/2})$ and number of edges being $O(|M|)$. The call to Max-Flow (in Line 2 of exemplary pseudocode 720) refers to any suitable maximum flow process (e.g., ones based on augmenting paths (e.g., Edmunds-Karp), ones based on push-relabel (e.g., Dinitz), and the like). Thus, the overall running time of this process configured to solve the matchmaking problem is dependent on the specific choice of maximum flow process used (although it is noted that most, if not all, of them can be expected to run in polynomial time).

Resource Assignment Process with Costs

In one embodiment, a resource assignment process is configured to solve the matchmaking problem with costs of Definition 9.

In one embodiment, the resource assignment process configured to solve the matchmaking problem with costs is a greedy resource assignment process. In one such embodiment, for example, the resource assignment process may be similar to the greedy resource assignment process described hereinabove (e.g., similar to exemplary pseudocode 710 of FIG. 7A).

In one embodiment, the resource assignment process configured to solve the matchmaking problem with costs is based on a reduction to the minimum-cost maximum-flow problem. The reduction given in Definition 10 is extended to instances of the matchmaking problem with costs to produce a flow graph with costs on edges as follows. For all edges $e=(r_i,o_j) \in E_2$, we associate a cost of $C(j, i)$ and for all other edges we associate a cost of 0. It may then be shown that, in this flow graph, the cost of any flow f is the same as the same as the value of COST(A(f)) (as given by Definition 11 and Definition 8). It then follows, from Corollary 1, that for any minimum-cost maximum-flow f, the assignment A(f) is a request-optimal assignment with minimum cost among all request-optimal assignments. The minimum-cost maximum-flow can be computed in polynomial time; however, the complexities are higher than for computing just the maximum flow, with the best known processes running in $O(|V|^2|E|^3 \log(|V|))$ time. In one such embodiment, for example, the resource assignment process may be similar to the maximum flow resource assignment process described hereinabove (e.g., similar to exemplary pseudocode 720 of FIG. 7B).

It is noted that the matchmaking problem with costs may exclude or include upper-bound constraints on the requests.

Incremental Computation of Resource Assignments Under Changes

The reduction given by Corollary 1 also yields processes for incrementally adjusting optimal resource assignments (e.g., when offer, request, or upper-bound specifications change) without having to re-compute an optimal resource assignment from scratch. The basis of this incremental computation is that processes for maximum flow are structured around increasing feasible flows using augmenting paths. Thus, the processes can incrementally compute maximum flows starting from any feasible flow. For changes to the specification that only increase offers, requests, or upper bounds, the previously computed assignment corresponds to a feasible flow for the new specification and, thus, can be augmented to yield a new maximum flow and request-optimal assignment. For changes that reduce requests, offers, or upper bounds, a corresponding reduction can be applied to the current assignment to yield a feasible flow for the new instance which can be augmented to yield a new optimal assignment. It is noted that one skilled in the art and informed by the teachings herein would understand the appropriate reduction to construct a new feasible flow in such cases.

Although the presentation of the formal definition and analysis of the matchmaking problem and associated matchmaking solution is primarily provided within the context of a specific type of environment (namely, a personal cloud environment including personal clouds having nodes), it will be appreciated that the formal definition and analysis of the matchmaking problem and associated matchmaking solution may be adapted for use within any suitable type of environment.

As depicted and described herein with respect to FIG. 2, a resource assignment, including an indication of an association between resources requests and resource offers, is determined using a resource specification. The relevant information of the resource assignment may then be communicated to the elements from which the associated resource offers and resource requests were received. An exemplary method for communicating the results of determining the resource assignment is depicted and described with respect to FIG. 8.

Figure 8:
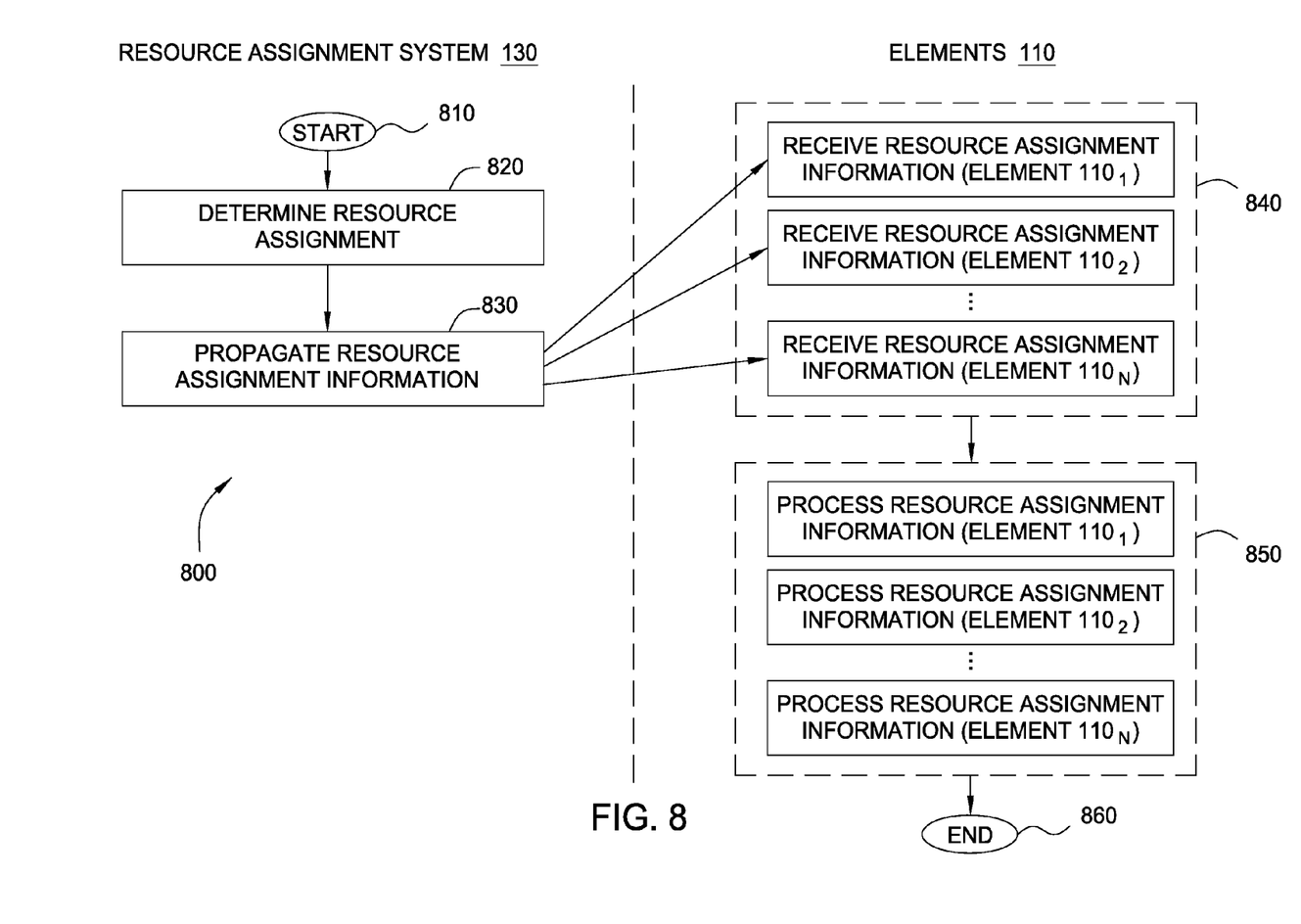
FIG. 8 depicts one embodiment of a method for configuring a resource assignment within an environment.

FIG. 8 depicts one embodiment of a method for configuring a resource assignment within an environment. As depicted in FIG. 8, a portion of the steps of method 800 are executed by the resource assignment system 130 and a portion of the steps of method 800 are executed by the elements 110.

At step 810, method 800 begins.

At step 820, a resource assignment is determined by the resource assignment system 130. The resource assignment includes resource assignment information, such as: (1) for each resource request of an element, an indication of the other element or elements which will provide the resources for the resource request of the element and (2) for each resource offer of an element, an indication of the other element or elements which will use the resources offered in the resource offer. The resource assignment may be determined as depicted and described with respect to one FIG. 2.

At step 830, resource assignment information is propagated from resource assignment system 130 to the respective elements 110.

At step 840, the resource assignment information is received at the respective elements 110 from the resource assignment system 130.

At step 850, the elements 110 process the respective received resource assignment information to enable sharing of resources in accordance with the determined resource assignment. The processing may depend on the types of resources to be shared.

For example, in the case of sharing of CPU resources: (1) an offering element may dedicate one or more processing threads for use by the requesting element(s) for which the offering element is to host CPU resources (where the identity of the requesting element may be communicated to the offering element so that the offering element may be configured to use the appropriate dedicate CPU resources upon receiving communications from the requesting element) and (2) a requesting element may receive IP address and other relevant information which the requesting element may use to communicate with the offering element for purposes of utilizing the CPU resources of the offering element which have been designated for use by the requesting element.

For example, in the case of sharing of storage resources: (1) an offering element may dedicate storage space for use by the requesting element(s) for which the offering element is to host storage resources (where the identity of the requesting element may be communicated to the offering element so that the offering element may be configured to use the appropriate dedicate storage resources upon receiving communications from the requesting element) and (2) a requesting element may receive IP address and other relevant information which the requesting element may use to communicate with the offering element for purposes of utilizing the storage resources of the offering element which have been designated for use by the requesting element.

At step 860, method 800 ends.

Although primarily depicted and described herein with respect to embodiments in which the resource offers and resource requests for a set of elements are represented using a single resource specification, it is noted that the resource offers and resource requests for a set of elements may be represented using one or more resource specifications.

Figure 9:
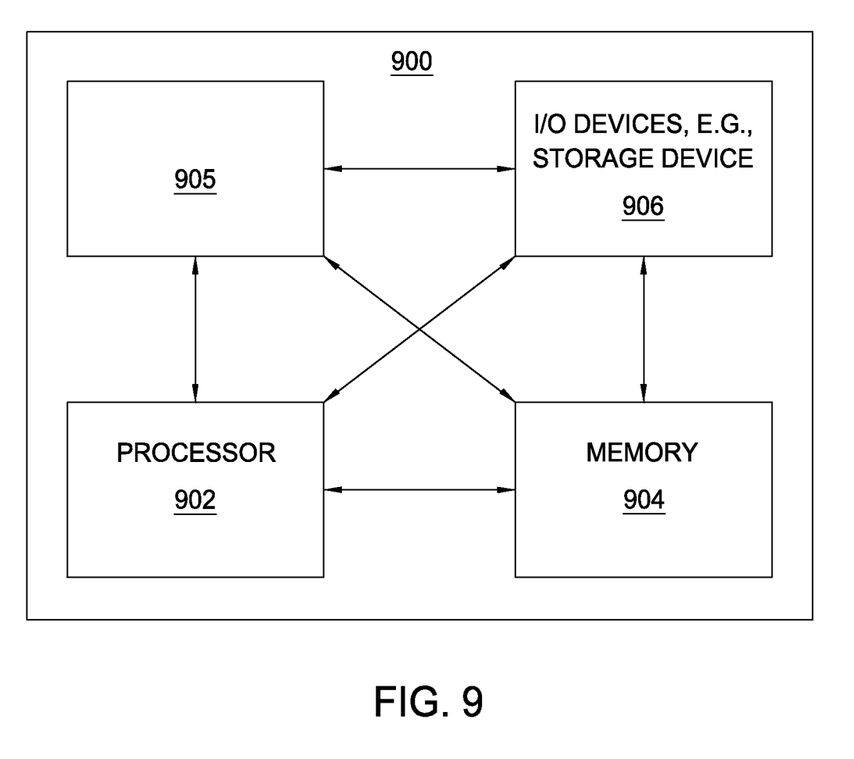
FIG. 9 depicts a high-level block diagram of a computer suitable for use in performing functions described herein.

FIG. 9 depicts a high-level block diagram of a computer suitable for use in performing functions described herein.

As depicted in FIG. 9, computer 900 includes a processor element 902 (e.g., a central processing unit (CPU) and/or other suitable processor(s)) and a memory o04 (e.g., random access memory (RAM), read only memory (ROM), and the like). The computer 900 also may include a cooperating module/process 905 and/or various input/output devices 906 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., for executing on a general purpose computer (e.g., via execution by one or more processors) so as to implement a special purpose computer) and/or may be implemented in hardware (e.g., using one or more application specific integrated circuits (ASIC) and/or one or more other hardware equivalents).

In one embodiment, the cooperating process 905 can be loaded into memory 604 and executed by the processor 902 to implement functions as discussed herein. Thus, cooperating process 905 (including associated data structures) can be stored on a computer readable storage medium, e.g., RAM memory, magnetic or optical drive or diskette, and the like.

It will be appreciated that computer 900 depicted in FIG. 9 provides a general architecture and functionality suitable for implementing functional elements described herein and/or portions of functional elements described herein. For example, the computer 900 provides a general architecture and functionality suitable for implementing one or more of one or more of the elements 110, resource assignment system 130, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively coupled to the processor, the processor configured to:
receive one or more resource specifications associated with a plurality of elements, wherein the one or more resource specifications comprise, for each of the elements, a resource request comprising an indication of a quantity of resources requested by the element and a resource offer comprising an indication of a quantity of resources offered by the element for use by one or more other elements;
construct a maximum flow resource graph based on the one or more resource specifications; and
apply a maximum flow process to the maximum flow resource graph to determine thereby a resource assignment, the resource assignment comprising an indication of an association between the resource requests and the resource offers.

2. The apparatus of claim 1, wherein the one or more resource specifications further comprises, for each of the elements, upper-bound constraint information indicating one or more upper-bound constraints on an amount of resources to be hosted for the element at one or more other elements.

3. The apparatus of claim 1, wherein the one or more resource specifications further comprises, for each of the elements, cost information indicating a cost charged by the element for hosting resources of one or more other elements.

4. The apparatus of claim 1, wherein, for constructing the maximum flow resource graph, the processor is configured to:
provide a source node and a sink node;
provide a plurality of request nodes associated with the respective plurality of resource requests of the one or more resource specifications;
provide a plurality of offer nodes associated with the respective plurality of resource offers of the one or more resource specifications;
provide a plurality of request edges between the source node and the respective request nodes, wherein the request edges are configured to represent the respective resources amounts associated with the resource requests;
provide a plurality of offer edges between the respective offer nodes and the sink node, wherein the offer edges are configured to represent the respective resources amounts associated with the resource offers; and
provide a plurality of sets of cross-edges between the request nodes and the offer nodes, wherein the cross-edge between one of the request nodes and one of the offer nodes is configured to represent an upper-bound constraint on an amount of resources that can be hosted at an offering element of the offer node on behalf of a requesting element of the requesting node.

5. A method, comprising:
using a processor and a memory for:
receiving one or more resource specifications associated with a plurality of elements, wherein the one or more resource specifications comprise, for each of the elements, a resource request comprising an indication of a quantity of resources requested by the element and a resource offer comprising an indication of a quantity of resources offered by the element for use by one or more other elements;
constructing a maximum flow resource graph based on the one or more resource specifications; and
applying a maximum flow process to the maximum flow resource graph to determine thereby a resource assignment, the resource assignment comprising an indication of an association between the resource requests and the resource offers.

6. The method of claim 5, wherein the one or more resource specifications further comprises, for each of the elements, upper-bound constraint information indicating one or more upper-bound constraints on an amount of resources to be hosted for the element at one or more other elements.

7. The method of claim 5, wherein the one or more resource specifications further comprises, for each of the elements, cost information indicating a cost charged by the element for hosting resources of one or more other elements.

8. The method of claim 5, wherein constructing the maximum flow resource graph comprises:
providing a source node and a sink node;
providing a plurality of request nodes associated with the respective plurality of resource requests of the one or more resource specifications;
providing a plurality of offer nodes associated with the respective plurality of resource offers of the one or more resource specifications;
providing a plurality of request edges between the source node and the respective request nodes, wherein the request edges are configured to represent the respective resources amounts associated with the resource requests;
providing a plurality of offer edges between the respective offer nodes and the sink node, wherein the offer edges are configured to represent the respective resources amounts associated with the resource offers; and
providing a plurality of sets of cross-edges between the request nodes and the offer nodes, wherein the cross-edge between one of the request nodes and one of the offer nodes is configured to represent an upper-bound constraint on an amount of resources that can be hosted at an offering element of the offer node on behalf of a requesting element of the requesting node.

9. An apparatus, comprising:
a processor and a memory communicatively coupled to the processor, the processor configured to:
receive one or more resource specifications associated with a plurality of elements, wherein the one or more resource specifications comprise, for each of the elements, a resource request comprising an indication of a quantity of resources requested by the element, a resource offer comprising an indication of a quantity of resources offered by the element for use by one or more other elements, and upper-bound constraint information indicating one or more upper-bound constraints on an amount of resources to be hosted for the element at one or more other elements; and
determine, using a resource assignment process, a resource assignment comprising an indication of an association between the resource requests and the resource offers.

10. The apparatus of claim 9, wherein the one or more resource specifications further comprises, for each of the elements, cost information indicating a cost charged by the element for hosting resources of one or more other elements.

11. The apparatus of claim 9, wherein the resource assignment process comprises a greedy resource assignment process.

12. The apparatus of claim 9, wherein the resource assignment process comprises a maximum flow resource assignment process.

13. The apparatus of claim 9, wherein, when executing the maximum flow resource assignment process, the processor is configured to:
construct a maximum flow resource graph based on the one or more resource specifications; and
apply a maximum flow process to the maximum flow resource graph to determine thereby the resource assignment.

14. The apparatus of claim 13, wherein, for constructing the maximum flow resource graph, the processor is configured to:
provide a source node and a sink node;
provide a plurality of request nodes associated with the respective plurality of resource requests of the one or more resource specifications;
provide a plurality of offer nodes associated with the respective plurality of resource offers of the one or more resource specifications;
provide a plurality of request edges between the source node and the respective request nodes, wherein the request edges are configured to represent the respective resources amounts associated with the resource requests;
provide a plurality of offer edges between the respective offer nodes and the sink node, wherein the offer edges are configured to represent the respective resources amounts associated with the resource offers; and
provide a plurality of sets of cross-edges between the request nodes and the offer nodes, wherein the cross-edge between one of the request nodes and one of the offer nodes is configured to represent an upper-bound constraint on an amount of resources that can be hosted at an offering element of the offer node on behalf of a requesting element of the requesting node.

15. A method, comprising:
using a processor and a memory for:
receiving one or more resource specifications associated with a plurality of elements, wherein the one or more resource specifications comprise, for each of the elements, a resource request comprising an indication of a quantity of resources requested by the element, a resource offer comprising an indication of a quantity of resources offered by the element for use by one or more other elements, and upper-hound constraint information indicating one or more upper-bound constraints on an amount of resources to be hosted for the element at one or more other elements; and
determining, using a resource assignment process, a resource assignment comprising an indication of an association between the resource requests and the resource offers.

16. The method of claim 15, wherein the one or more resource specifications further comprises, for each of the elements, cost information indicating a cost charged by the element for hosting resources of one or more other elements.

17. The method of claim 15, wherein the resource assignment process comprises a greedy resource assignment process.

18. The method of claim 15, wherein the resource assignment process comprises a maximum flow resource assignment process.

19. The method of claim 15, wherein executing the maximum flow resource assignment process comprises:
   constructing a maximum flow resource graph based on the one or more resource specifications; and
   applying a maximum flow process to the maximum flow resource graph to determine thereby the resource assignment.

20. The method of claim 19, wherein constructing the maximum flow resource graph comprises:
   providing a source node and a sink node;
   providing a plurality of request nodes associated with the respective plurality of resource requests of the one or more resource specifications;
   providing a plurality of offer nodes associated with the respective plurality of resource offers of the one or more resource specifications;
   providing a plurality of request edges between the source node and the respective request nodes, wherein the request edges are configured to represent the respective resources amounts associated with the resource requests;
   providing a plurality of offer edges between the respective offer nodes and the sink node, wherein the offer edges are configured to represent the respective resources amounts associated with the resource offers; and
   providing a plurality of sets of cross-edges between the request nodes and the offer nodes, wherein the cross-edge between one of the request nodes and one of the offer nodes is configured to represent an upper-bound constraint on an amount of resources that can be hosted at an offering element of the offer node on behalf of a requesting element of the requesting node.

* * * * *